United States Patent
Wigant et al.

(10) Patent No.: US 9,085,444 B2
(45) Date of Patent: Jul. 21, 2015

(54) FLEXIBLE ARTICULATED JIB ARM

(75) Inventors: Lars Wigant, Billum (DK); Martin Rossen, Esbjerg (DK)

(73) Assignee: SubCPartner A/S, Esbjerg (DK)

(*) Notice: Subject to any disclaimer, the term of this patent is extended or adjusted under 35 U.S.C. 154(b) by 69 days.

(21) Appl. No.: 13/700,207

(22) PCT Filed: May 30, 2011

(86) PCT No.: PCT/DK2011/050182
§ 371 (c)(1),
(2), (4) Date: Nov. 27, 2012

(87) PCT Pub. No.: WO2011/150930
PCT Pub. Date: Dec. 8, 2011

(65) Prior Publication Data
US 2013/0089405 A1   Apr. 11, 2013

(30) Foreign Application Priority Data
May 31, 2010   (DK) .................................. 2010 70226

(51) Int. Cl.
| B66C 23/94 | (2006.01) |
| B66C 23/04 | (2006.01) |
| B66C 23/20 | (2006.01) |
| B66C 23/64 | (2006.01) |
| F03D 1/00 | (2006.01) |
| E05D 3/14 | (2006.01) |
| F16M 13/02 | (2006.01) |

(52) U.S. Cl.
CPC ................ *B66C 23/94* (2013.01); *B66C 23/04* (2013.01); *B66C 23/207* (2013.01); *B66C 23/64* (2013.01); *F03D 1/003* (2013.01); *E05D 3/147* (2013.01); *F05B 2230/61* (2013.01); *F05B 2240/916* (2013.01); *F16M 13/02* (2013.01); *Y02E 10/728* (2013.01)

(58) Field of Classification Search
USPC ....... 108/64; 138/120; 16/366; 212/223, 347; 248/278.1, 282.1; 403/291, 62; 414/738, 744.4, 744.5, 917; 74/490.05, 74/490.1
See application file for complete search history.

(56) References Cited

U.S. PATENT DOCUMENTS

| 24,912 A * | 7/1859 | Parce ............................. 212/223 |
| 898,572 A * | 9/1908 | Gerhard ....................... 248/282.1 |
| 1,023,438 A | 4/1912 | Muncaster |
| 1,054,241 A * | 2/1913 | Richardson et al. ........ 248/282.1 |

(Continued)

FOREIGN PATENT DOCUMENTS

| CN | 201553563 | 8/2010 |
| EP | 1016617 | 5/2000 |
| WO | 2010136026 | 12/2010 |

*Primary Examiner* — Gregory Adams
(74) *Attorney, Agent, or Firm* — James Creighton Wray (57) ABSTRACT

Crane arm, preferably to be employed on pillars, comprising a plurality of connecting links, each connecting link exhibiting a predetermined height, preferably being oriented in the direction of the force of gravity, whereby each connecting link in a longitudinal direction, preferably rectangular to the direction of the force of gravity, exhibits a first end portion and a second end portion, and at the first end portion provided with at least one first means for providing a rotary connection with a successive connecting link and at the second end portion provided with at least one second means for the receiving of the first means for providing a (the) rotary connection with the preceding connecting link enabling rotation in a direction around the pillar preferably being oriented rectangular to the direction of the force of gravity.

8 Claims, 10 Drawing Sheets

(56) References Cited

U.S. PATENT DOCUMENTS

| | | | |
|---|---|---|---|
| 1,796,354 A * | 3/1931 | Ahlberg | 248/282.1 |
| 2,319,745 A * | 5/1943 | Napoli | 248/484 |
| 4,223,613 A * | 9/1980 | Yoshizawa | 108/64 |
| 4,568,051 A * | 2/1986 | Rosengren | 248/282.1 |
| 4,685,349 A * | 8/1987 | Wada et al. | 74/490.04 |
| 4,978,274 A * | 12/1990 | de Groot | 414/744.3 |
| 5,667,354 A * | 9/1997 | Nakazawa | 414/744.5 |
| 6,688,838 B2 * | 2/2004 | Lavitsky et al. | 414/744.5 |
| 6,992,254 B2 * | 1/2006 | Komiya | 174/138 B |
| 7,047,835 B2 * | 5/2006 | Yamagishi | 74/490.03 |
| 7,150,206 B2 * | 12/2006 | Utaki | 74/502.6 |
| 7,197,790 B1 * | 4/2007 | Edmondson | 16/336 |
| 7,204,656 B2 * | 4/2007 | Bjuhr | 403/4 |
| 2003/0165378 A1 * | 9/2003 | Lavitsky et al. | 414/744.5 |

* cited by examiner

FLEXIBLE ARTICULATED JIB ARM

This application claims the benefit of Danish Application No. PA 2010 70226 filed May 31, 2010, and PCT/DK2011/050182 filed May 30, 2011, International Publication No. WO 2011/150930, which are hereby incorporated by reference in their entirety as if fully set forth herein.

FIELD OF THE INVENTION

The present invention relates to a flexible articulated jib crane arm. The crane arm, preferably to be employed on pillars, comprise a plural of connecting links, each connecting link exhibiting a predetermined height, preferably being oriented in the direction of the force of gravity, whereby each connecting link in a longitudinal direction, preferably rectangular to the direction of the force of gravity, exhibits a first end portion and a second end portion and at the first end portion is provided with at least one first means for providing a rotary connection with a successive connecting link and at the second end portion is provided with at least one second means for the receiving of the first means for providing a (the) rotary connection with the preceding connecting link enabling rotation in a direction around the pillar preferably being oriented rectangular to the direction of the force of gravity.

BACKGROUND OF THE INVENTION

Jib arms and cranes are known in a great variation of sizes and uses. They thus remove objects from one place to another. In some cases the object at first is to be moved vertically upwards, i.e. to be released from a supporting location, being located at a level of some nature, whereupon, possibly, the jib arm or crane may rotate and carry the object to a new position, the object then having been brought to a location lying at another, higher or lower positioned level or at the same level as that implied by the initial position. A lot of technical solutions and devices exist, which solve such tasks of transferring an object, being provided more or less automatically or mechanically.

Generally, the trend of development in respect of providing more automized jib arms and cranes tends towards devices which at best are to be distinguished as robots.

Jib arms and cranes to a large extend are being developed to be employed at specific applications being specific in that the objects, which are to be moved, do exhibit individually specific sizes and shapes. Thus, there may be jib arms of fine-mechanic nature, and cranes which are capable of moving objects of sub-grams sizes, and jib arms working with high-precision tolerances, and cranes capable of moving objects exhibiting weights sized in tons.

Furthermore, jib arms and cranes to a large extend are developed to be used within specific surroundings within which objects are to be moved around. Thus, a simulating of a human arm or hand may be wanted within an industrial plant, in which the surroundings are hostile to man.

Thus, as unique jib arms and cranes to be employed in fully unique surroundings by way of example can be mentioned jib arms and cranes serving to unload a satellite from a space shuttle for being positioned within a geostationary orbit in space. Such a jib arm or crane requires a very special technical layout in spite of when loading the same load into the space shuttle within other surroundings, quite another type of jib arm or crane is employed, and a third type of jib arm or crane is going to be employed when moving the same satellite in the working space where it is assembled.

A more specific range for the present invention to be used is in relation to offshore installations in relation to windmills. Such offshore windmills are to be deployed on base supports carried on the sea bottom and include towers to be erected upon these base supports.

In part while deploying these constructions, and in part especially when carrying out maintenance, inspection or repair of an offshore windmill it is required to be able to unload from a vessel loads which include construction elements or measuring equipments or minor elements intended for the windmill itself.

According to their nature these loads are forwarded to the site by means of a vessel and in most cases the vessel is approached closely to the base support of the windmill. Though, in some situations the vessel is anchored to the base support of the windmill, and in other situations of security reasons such an anchoring is not possible. It is thus also to be noted, that, as most commonly, the weather and the sea waves make an anchoring impossible. Furthermore, much time will have to be spend for the carrying out of an anchoring.

It is well-known that loads on a vessel in case of offshore installations by the use of a so called Jack up, which either is positioned on the vessel itself or on another vessel with the sole purpose to provide a hoisting means in an offshore environment.

In most cases a platform on either the base support or on the windmill tower taken in total in the following is designated as the pillar. This platform can be a platform which in a radial direction extends from the pillar, or it can be a platform which by 360° surrounds the pillar.

In U.S. Pat. No. 1,023,438 a crane is disclosed which comprises more joints and is fitted to be placed on a pillar.

Although this disclosed crane is useful in case of it being stationary deployed, the disclosed crane is relatively complicated assembled and can not be assembled nor be taken apart without difficulty.

OBJECT OF THE INVENTION

It is the aim of the present invention to provide a jib arm or crane arm, to be understood as a crane, a hoisting device, a loading or unloading device, which is useful when loading and/or unloading a vessel in the vicinity of a pillar at an offshore device, such as an offshore windmill.

The crane arm has under the factual conditions to be simple to use and furthermore to be able to be used manually.

A further and other purpose is that it shall be possible to leave the crane arm on the pillar, and furthermore, the crane shall be easy to deploy and to disassemble on the pillar.

DESCRIPTION OF THE INVENTION

The abovementioned purpose is attained by means of a crane arm, preferably suited for use on pillars with a first crane end and with the opposite crane end being a free end comprised of a plural of suspension links, each suspension link while being oriented rectangular to the direction of gravity longitudinally having a first end and a second end, the first end being provided with at least one first means for providing a rotary connection to a successive suspension link preferably rectangular to the direction of gravity, and with the second end provided with at least one other, second means for the receiving of the first means as to establish a rotary connection to the previous suspension link enabling rotation, preferably in a direction rectangular to the force of gravity, about the pillar.

Herethrough, a particular simple crane arm is provided which fulfils the purpose and defers from the state of the art in attaining that the crane arm and each suspension link easily and without tools are able to be mounted together with or oppositely to become disassembled from other suspension links.

Thus, the crane arm is able to operate around the pillar, because the plural of suspension links enable that the crane arm can be varied in shape and in length. The maximum length which is attainable is equal to the length of each suspension link multiplied with the number of suspension links.

The crane arm can be folded together in that a suspension link is being rotated in a direction around the rotary connection, and the successive suspension link is being rotated in the opposite direction about the successive rotatable suspension link.

The crane arm can by means of a suitable number of suspension links, i.e. with a minimum of three suspension links, form a closed circle in the preferably horizontal plane.

Furthermore, the crane arm can be parked close to the pillar when ever the crane arm is not in use.

According to an embodiment of the crane arm each rotary suspension link is provided with a rotary shaft which preferably is vertically oriented.

When provided with vertical rotary shafts the crane arm will, stably, remain in a horizontal plane.

When provided with vertical shafts which are tilting in respect to the vertical, the crane arm, due to the influence of gravity, tends to move and to attain a natural dynamically stable equilibrium.

If in case, by way of example, one or more of the rotary shafts are oriented tilting in respect to the orientation of the force of gravity, i.e. that the rotary shaft, relatively to the orientation of the force of gravity, forms an acute angle at the lower end, the crane arm, due to the force of the gravity, will attain a natural extended orientation in respect to the other crane arm end, i.e. as far away from the first crane arm end as it is able to move.

If by way of example one or more rotary shafts are being tilted in respect of the orientation of the force of gravity, so that the rotary shaft in respect of the direction of the force of gravity above forms an acute angle, the crane arm due to the force of gravity will be approaching the first crane arm end. i.e. in the manner that the crane arm in a different manner is either folding or bending.

According to a further embodiment the crane arm is unique in that the crane arm at the other crane arm end is provided with a terminating link comprising another means for a rotary connection to a preceding suspension link and hoisting means for manipulating an object.

In this way the crane arm includes hoisting means to be employed when moving some object.

According to an embodiment of the crane arm hoisting means are to be understood as means, which can be a travelling cat as well as a rope, a wire, a cable, mostly made of steel or the like and which connects the object to be moved with the terminating link.

According to an embodiment of the crane arm hoisting means are to be understood as being such means as a chain which connects the terminating link with the object to be moved.

Means as ropes, wires, cables, chains or the like flexible means may be provided while including a fastening means capable of being attached to the object. Thus, the fastening means may be a hook or closed loop or any other special fastening means of some kind adapted to handle the object according to its shape.

By hoisting means are to be understood any embodiment of crane arm means that may comprise a pulley-block or tackle. The terminating link may itself comprise or include installed a tackle or pulley-block by which the flexible hoisting means or falls are being set into movement and are operated either manually as by simply being pulled or by the employing of an automatic operable hauling winch which comprises a motor and a gear means.

Hoisting means should according to an embodiment of the crane arm be understood as means which include a winch. I.e. in the manner, that the terminating link may itself contain a winch or the link itself may carry a winch, the winch being operated either manually by employing a pulling means or automatically by employing a hauling winch which includes a motor and a gear means According to an alternative embodiment of the terminating link this link is provided with a pulley capable to guide a rope or a chain which manually is being pulled or kept in position.

According to a further embodiment according to the invention the crane arm is characterized in that each of the connecting links comprises guiding means for the guiding of a flexible hoisting means or fall which may be a rope, a tow, a wire, a cable, a chain or other similar means.

In this manner the flexible means may be run from the first crane end portion to the next crane end portion carrying the terminating link.

According to an embodiment of the crane arm a winch is provided at the first crane end portion operating with the hoisting rope running through or along the crane arm and through the terminating link further on to the object to be hoisted.

According to an embodiment the guiding means within the connecting link consists of one or more pulleys, pulley-blocks or channel tubings which guide(s) the fall or hoisting rope in a horizontal direction.

A further embodiment according to the invention is characterized in that the height of the individual connecting links is tapering from the first crane end portion towards the second crane end portion.

According hereto a crane arm is provided which is embodied by means of a minimum of construction material while simultaneously providing a strength capable of carrying its own weight including that of the object to be hoisted.

A further embodiment of the crane arm according to the invention is characterized in that the connecting link comprises a centre element of a material which is a metal that can be aluminium or a material being a composite.

These aforementioned materials are light weight materials and are, while being exposed to offshore weather conditions, of a durable kind. Herethrough the connecting link, in particular in vertical direction, attains structural stability.

According to an embodiment the centre element exhibits a cylindric structure with the longitudinal direction being arranged parallel to the force of gravity. The cross section of the centre element is typically embodied as being circular, elliptical or polygonic, and at a special occasion the centre element may be a plate.

According to an alternative embodiment the centre element is a grid structure being enclosed or supported within one or more frames.

According to an embodiment the composite material of the centre element is glass fibre, carbon fibre or similar material.

According to an embodiment of a centre element this is embodied with a floating means or a closed space filled with air as to provide a density of the connecting link being less than the density of water and in particular less than that of salt water.

Herethrough it is safeguarded that a connecting link being dropped into the sea will remain floating.

According to a further embodiment the crane arm according to the invention is characterized in that at least one connecting link at least a portion of the external circumference of the cross section in a direction rectangular to the force of gravity is made of chock absorbing material which can be rubber, polyethylene, polyutherene or similar soft materials.

In this manner wear and tear due to common use is diminished and in particular in situations when caused by strong wind or other weather conditions employing the device has to be terminated and the crane arm is let free.

Furthermore, the wear and tear while parking the crane arm against the pillar becomes diminished when due to rough weather, such as a storm, the crane arm becomes handled roughly and bumps against the pillar.

According to a further embodiment the crane arm according to the invention is characterized in that the first means is a protrusion which exhibits a circular cross section and is oriented against the force of gravity and cooperates with the second means which exhibits a complementary perforation to provide a rotary connection.

In this manner according to the invention a, in particular simple, rotary connection between the two connecting links, is provided. Simultaneously, a simple solution is provided and therethrough attaining that a connecting link can be placed on a preceding connecting link and operate together with it and be removed without use of any tools. In this manner the crane arm can be brought to, assembled, operated and dismantled at an offshore installation.

According to a further embodiment the crane arm according to the invention is characterized in that a connecting link comprises a first means and a second means placed in an upper holding means being mounted at the upper end of a centre element and a first means in a lower first holding means placed at the lower end of the centre element including a second means in a lower second holding means placed outermost at the lower end of the centre element, and in that the upper first and second means in relation to the lower first and second means are placed in relation to each other to form a first rotary axis and a second rotary axis, and whereby the rotary axes preferably are arranged in parallel.

According to an embodiment of the crane arm the holding means preferably are plane and are arranged protruding radially from the centre element. In this way the flat faces of the holding means are the contacting faces between two consecutive connecting links, whereby the flat faces of a previous connecting link functions as support for the holding means on a successive connecting link. In this manner a connecting link is able to be stacked upon a previous connecting link and thus simultaneously with the two connecting links are rotary.

According to an embodiment according to the invention a holding means is a plate exhibiting a perforation which is complementary to the shape of the centre element to achieve mutual fitting/registering. At a particular embodiment, whereby the centre element exhibits a circular cross section, the perforation within the holding means is a circular hole thereby enabling a close enclosing of the centre element.

According to a further embodiment the crane arm according to the invention is characterized in that the crane arm at the first crane end portion exhibits a first connecting link with a first means for the rotary connection to the successive connecting link and an assembling means for mounting the crane arm unto the pillar.

In this manner the crane arm can be mounted unto a pillar or a wall.

According to an embodiment of the crane arm the mounting means are adjustable as to provide a tilting of the first rotary axis calculated as from the first crane end portion towards the second crane end portion.

The crane arm is especially suited to be employed at offshore installations, such as at offshore wind mills.

Procedure for the loading and/or the offloading of an object from or to a vessel at a nearby position to an offshore installation exhibiting a pillar, and in that loading and/or offloading takes place through the use of a crane arm as according to any one of the preceding described embodiments.

Furthermore, the crane arm can be employed in other situations than at offshore wind mills.

DESCRIPTION OF THE DRAWING

An exemplified embodiment according to the invention is illustrated in the drawing, within which:

FIG. 4 illustrates a first connecting link cooperating with a mounting means to be placed on a flat, FIG. 5 isometrically illustrates the use of an articulated crane arm positioned on the lower portion of a tower of an offshore wind mill which is provided with a platform, and unto which a vessel is moored, and where furthermore an object to be hoisted is shown being connected to the crane arm, but still as being located within the vessel.

DETAILED DESCRIPTION OF THE INVENTION

Figure 1:
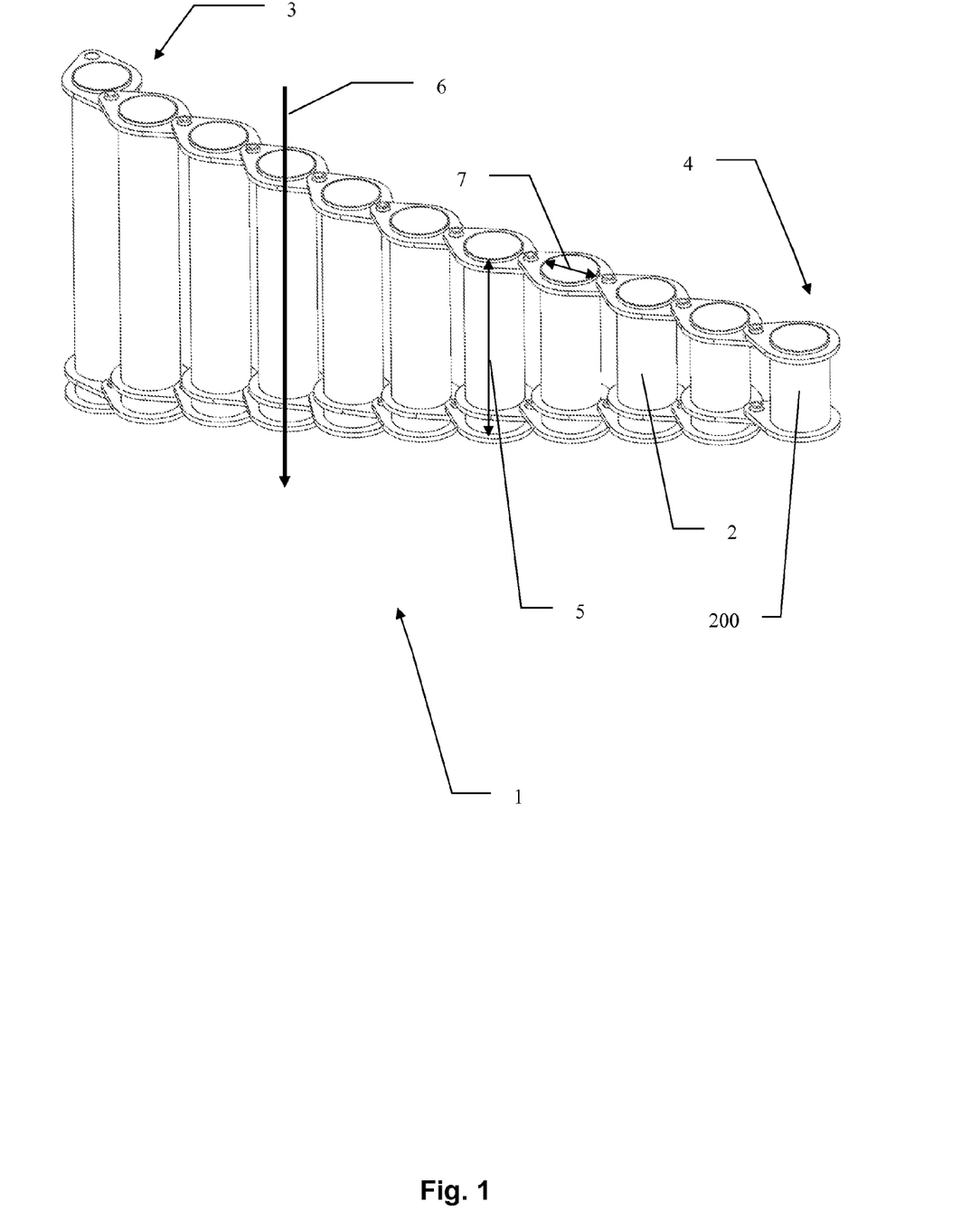
FIG. 1 isometrically illustrates a crane arm with a plurality of connecting links, FIG. 2 isometrically illustrates a connecting link.

In FIG. 1 an embodiment of a crane arm is shown which comprises a plurality, here an amount of eleven, connecting links 2. The crane arm 1 thus comprises a first crane end portion 3 and a second crane end portion 4.

The individual connecting links 2 exhibit a height 5, preferably oriented in parallel with the force of gravity 6, and, preferably in a direction rectangular to the force of gravity 6, a longitudinal direction 7.

The crane arm 1 is illustrated comprising connecting links 2 whereby the individual heights 5 are tapering from the first crane end portion 2 towards the second crane end portion 4, the end portion 4 being provided as a terminating link 200.

Figure 2:
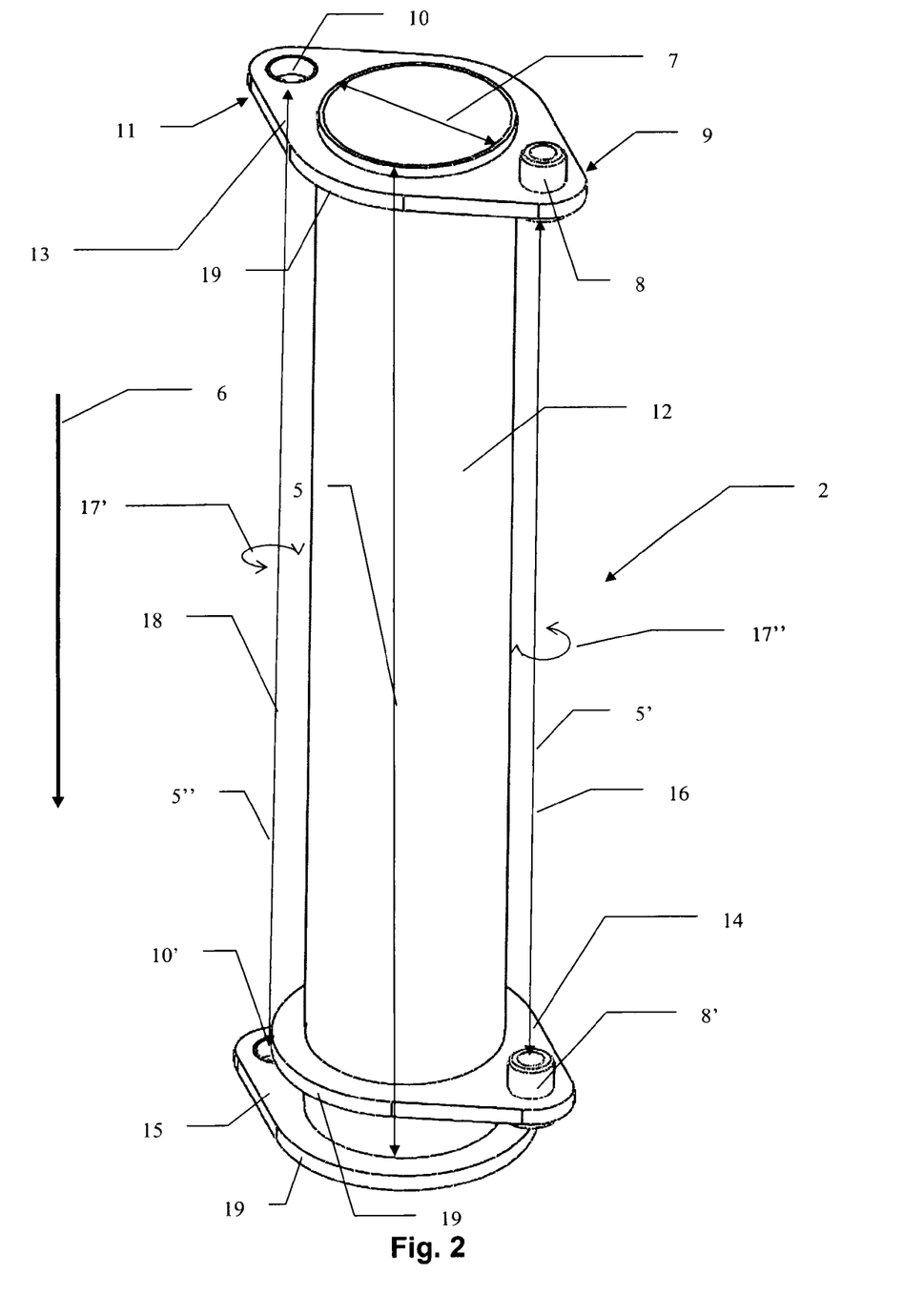

In FIG. 2 by way of an example a single connecting link 2 is shown comprising a given height 5 and at least one first upper connector means 8 at the first end portion 9 and at least one second upper connector means 10 at the second end portion 11, and therebetween the longitudinal direction 7 is shown. At the illustrated embodiment the mentioned at least one first means 8 and the at least one second means 10 are located at the upper end of the connecting link 2. Similarly, a further first lower connector means 8' and a further second lower connector means 10' are located at the lower end of the connecting link 2.

Similarly, a further first means 8' and a further second means 10' are located at the lower end of the connecting link 2.

At the illustrated embodiment the first and second means 8, 10 are mounted onto a centre element 12, which at the embodiment is shaped as a cylinder being by means of a common holding means 13 mounted at the upper end of the centre element 12. The holding means 13 is preferably flat shaped and at the central area provided with a hole which is shaped complementary to the centre element 12 to provide cooperation with the centre element 12.

According to the illustrated embodiment a first lower holding means 14 is provided at the lower end of the centre element 12 with the purpose of mounting a first lower connector means 8' at the lower end of the centre element 12. The first lower holding means 14 exhibits in similar manner a flat shape and is at the central area provided with a, in relation to the centre element 12 complementary, hole for the cooperation with the centre element 12. At the lower end of the centre element 12 a second lower holding means 15 is provided with the purpose of mounting the second lower connector means 10'. The second lower holding means 15 exhibits preferably a flat shape and is at the central area provided with a, in relation to the centre element 12 complementary, hole for the cooperation with the centre element 12.

The holding means 13, 14, 15 are placed upon the centre element 12 so that the first connector means 8, 8' (upper and respectively lower) exhibit a mutual distance equal to the height 5' and provide a first rotary axis 16 of a rotary connection 17" which preferably is parallel to the direction 6 of the force of gravity for cooperation with the successive connecting link 2. Equally, the second connector means 10, 10' (upper and respectively lower) exhibit a mutual distance equal to the height 5" and provide a second rotary axis 18 which preferably is parallel to the direction 6 of the force of gravity for cooperation with a rotary connection 17' with the previous connecting link 2'.

According to the illustrated embodiment the mutual distance between the first connector means 8, 8' is determined by the height 5' which is smaller than the mutual distance between the second connector means 10, 10' being determined by the height 5".

According to the illustrated embodiment the centre element 12 is a cylinder which provides stability in the direction 6 of the force of gravity, and material is being saved because the centre element 12 is hollow.

According to the illustrated embodiment the holding means 13, 14, 15 are provided with a shock absorbing material 19 between the first end portion 9 and the second end portion 11.

Figure 3:
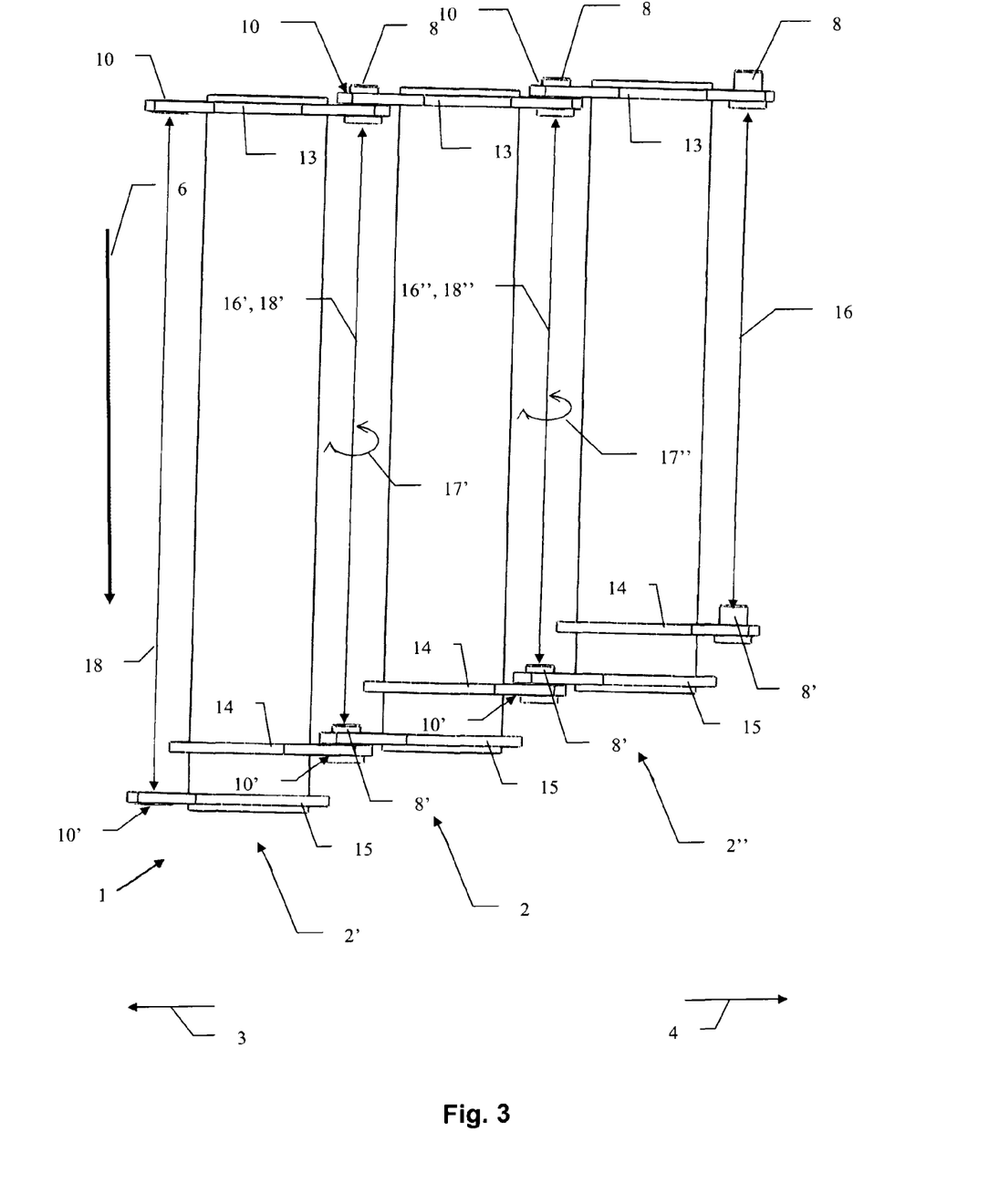
FIG. 3 illustrates a connecting link shown in cooperation with a previous and a successive connecting link through a first means and a second means providing a rotary connection between two connecting links.

In FIG. 3 is illustrated, with reference to FIGS. 1 and 2, a portion of the embodiment of a crane arm 1 showing a connecting link 2 which cooperates with a preceding connecting link 2' and a successive connecting link 2".

Thus, the portion of the crane arm 1 is to be understood as being simultaneously oriented in part towards the first crane end portion 3 and in part towards the second crane end portion 4.

The connecting link 2 cooperates with the preceding connecting link 2' through a rotary connection 17' while cooperating with the successive connecting link 2" through a rotary connection 17".

The rotary connection 17' towards the first crane end portion 3 is provided through the common rotary axes 16' and 18'. The rotary connection 17" towards the second crane end portion 4 is provided through the common rotary axes 16" and 18".

In FIG. 3 the upper first connector means 8, shown in FIG. 2, are also illustrated as cooperating with the upper second connector means 10 and, respectively, the lower first connector means 8' as cooperating with the lower second connector means 10'. This is provided in that the upper first and second means 8, 10 are provided in a common holding means 13, respectively, that each of the lower first means 8' is provided in a first holding means 14 respectively the second means 10' in a second holding means 15.

In the illustrated embodiment the rotary axis 18 positioned most close to the first crane end portion 3 is arranged oblique in relation to the orientation 6 of the force of gravity, provided in that the upper end is slanting away from the vertical orientation, whereas the crane arm 1 itself by means of the force of gravity is unrolled/unrolls away from the first crane end portion 3 towards a point of equilibrium.

According to the illustrated embodiment each of the consecutive connecting links 2, 2" may freely be mounted or respectively disassembled from the preceding connecting link 2', 2.

Figure 4:
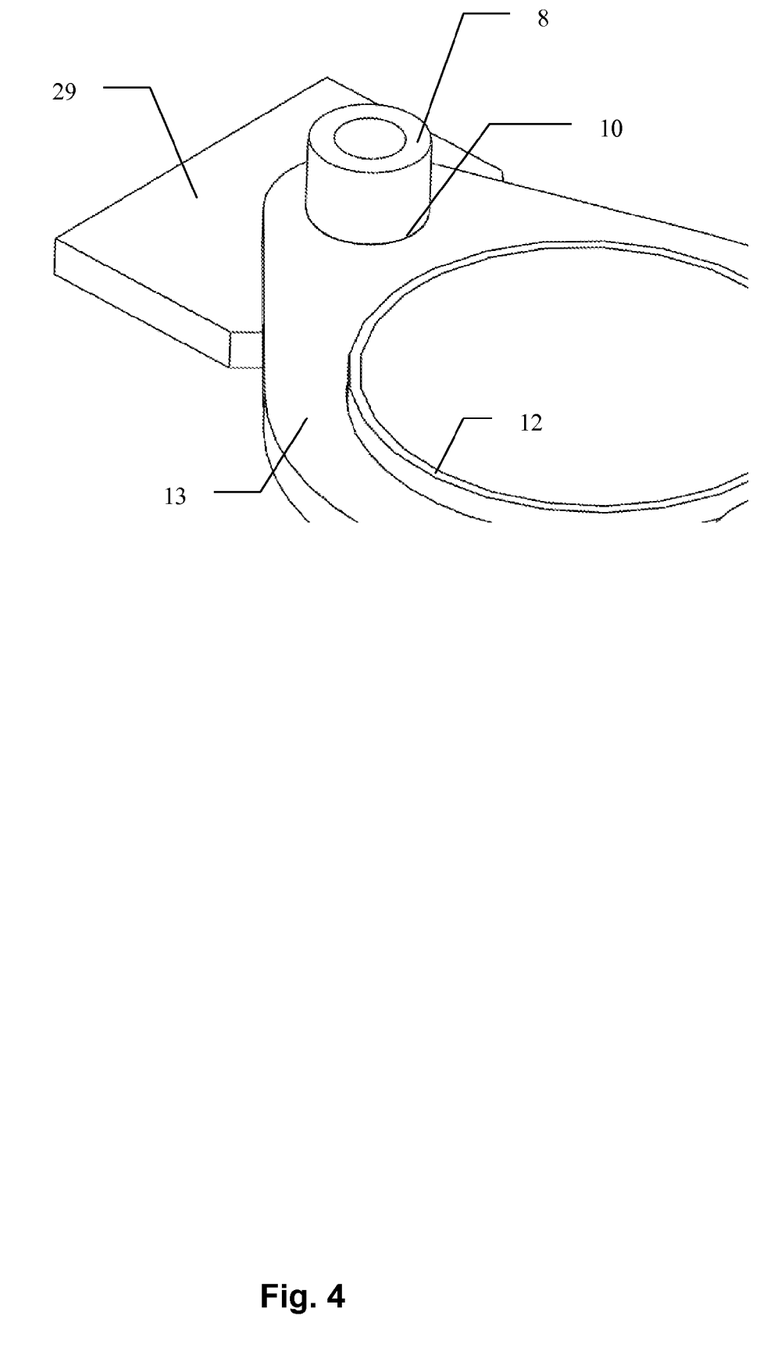

In FIG. 4 is illustrated a portion of a holding means 13 mounted upon a mounting means 29. This mounting means 29 is provided with a first upper connector means 8 for cooperation with a second upper connector means 10 here in shape of a circular perforation within the holding means 13. Within the illustrated embodiment the upper end of the centre element 12 is shown as visible. The lower end thereof is to be understood as being embodied in the same manner.

Figure 5:
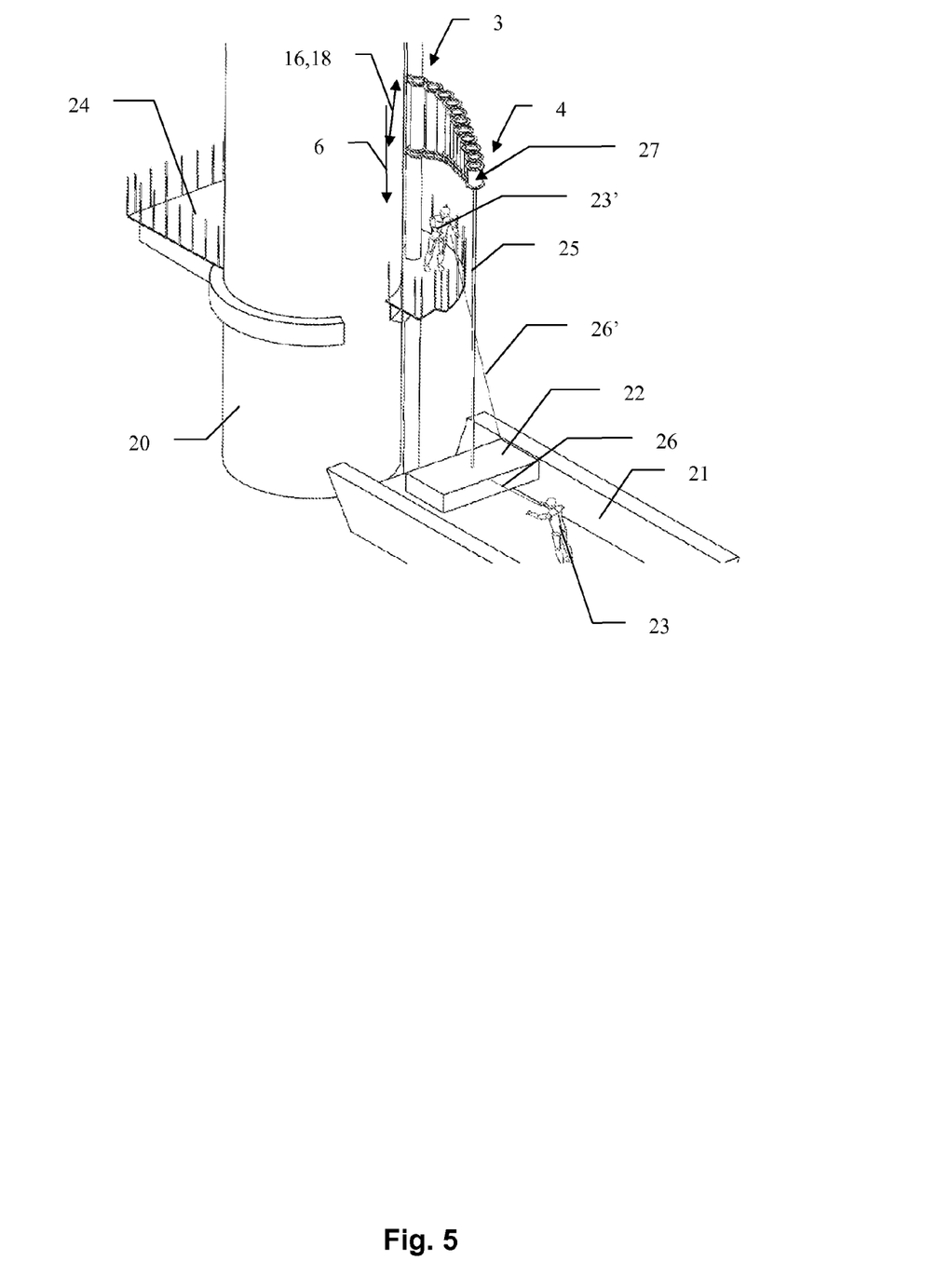

In FIG. 5 is isometrically illustrated a pillar 20, and by way of example at this embodiment the pillar 20 is arranged located offshore and here illustrated together with a vessel 21 from which an object 22 is to be unloaded. The unloading/loading takes place manually by persons 23, 23'. As illustrated one person 23 is on board the vessel 21 whereas the other person 23' is present on the platform 24 which is attached to the pillar 20.

At the illustrated embodiment the platform 24 halfway, i.e. through 180°, surrounds the pillar 20.

A crane arm 1 has its first end portion 3 mounted, above the platform 24, onto the pillar 20. The other end portion 4 of the crane arm 1 is protruding out, above the platform 24, and is illustrated as hovering above the vessel 21.

From the second end portion 4 of the crane arm 1 a fall 25 is hanging down which fall (25) can be a rope, a wire, a cable, a chain or the like which is connected to the object 22.

At the illustrated embodiment the object 22 is bridled by means of two reins 26, 26', one rein 26 being held by the person 23 on the vessel 21, the other rein 26' being held by the person 23' on the platform 24.

With reference to FIG. 3 the rotary axes 16, 18 of the crane arm 1 (for reasons of a better understanding being shown somewhat distorted in FIG. 3) are vaguely slanting in relation to the direction 6 of the force of gravity, so that the force of gravity in a natural manner will keep the second crane end portion 4 of the crane arm 1 carrying the object 22 away free of the pillar 20.

At the illustrated embodiment a winch 27 is provided at the outermost connecting link 2 at the second crane end portion 4 of the crane arm 1.

Figure 6:
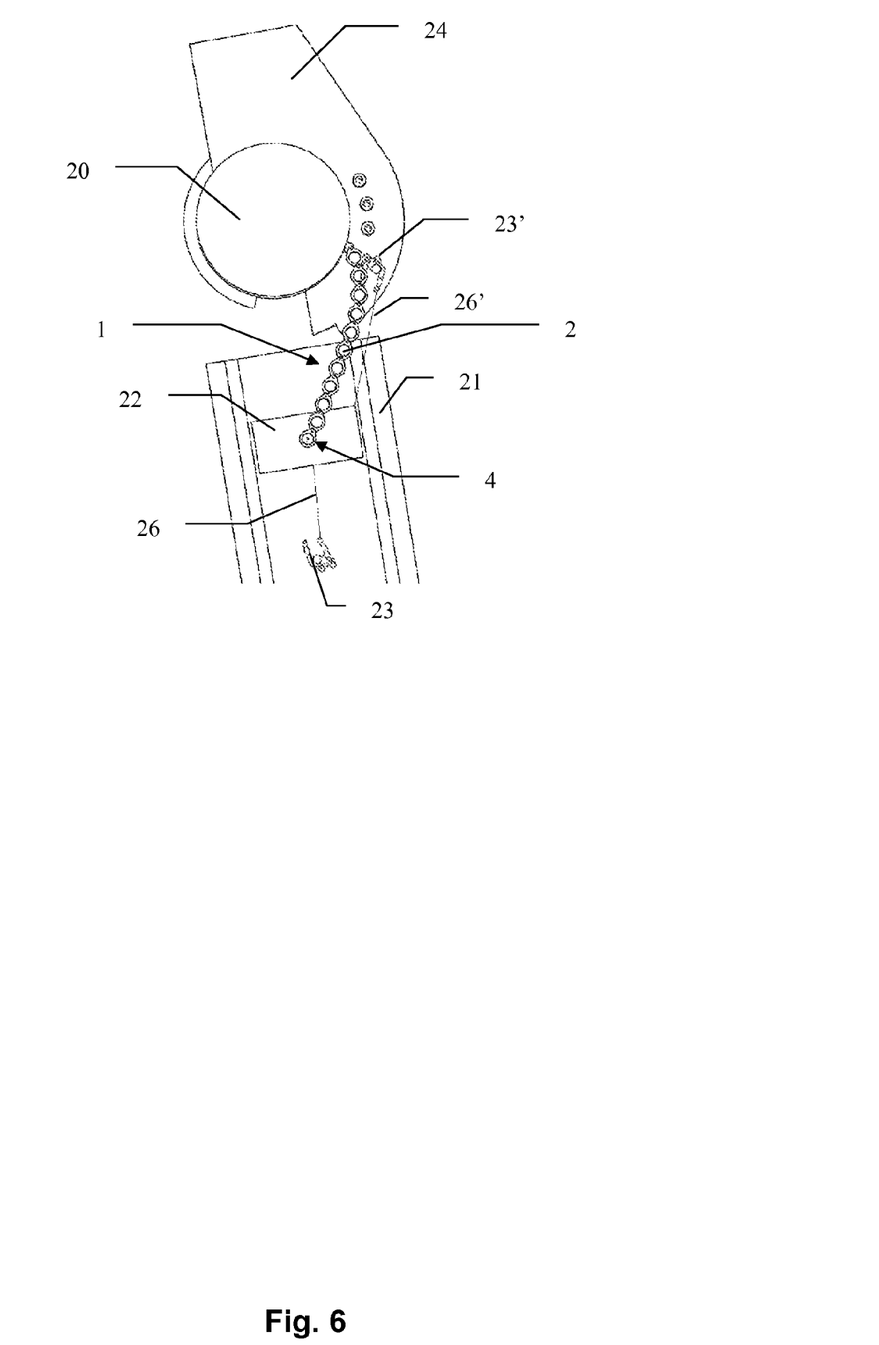
FIG. 6 illustrates the same as according to FIG. 5, but as viewed from above, i.e. as included in a plane oriented rectangular to the force of gravity.

In FIG. 6 the same illustrated embodiment and situation as according to FIG. 5 is illustrated, but as viewed from above and in detail as described according to FIG. 5.

By means of FIG. 6 it is easier viewed how the first rein 26 makes it possible to pull and turn the crane arm 1 out over the vessel 21, and that the other rein 26' makes it possible to turn the second crane end portion 4 of the crane arm 1 out over the vessel 21.

As compared to FIG. 5 the plurality of connecting links 2 of the crane arm 1 are more easily viewed.

Figure 7:
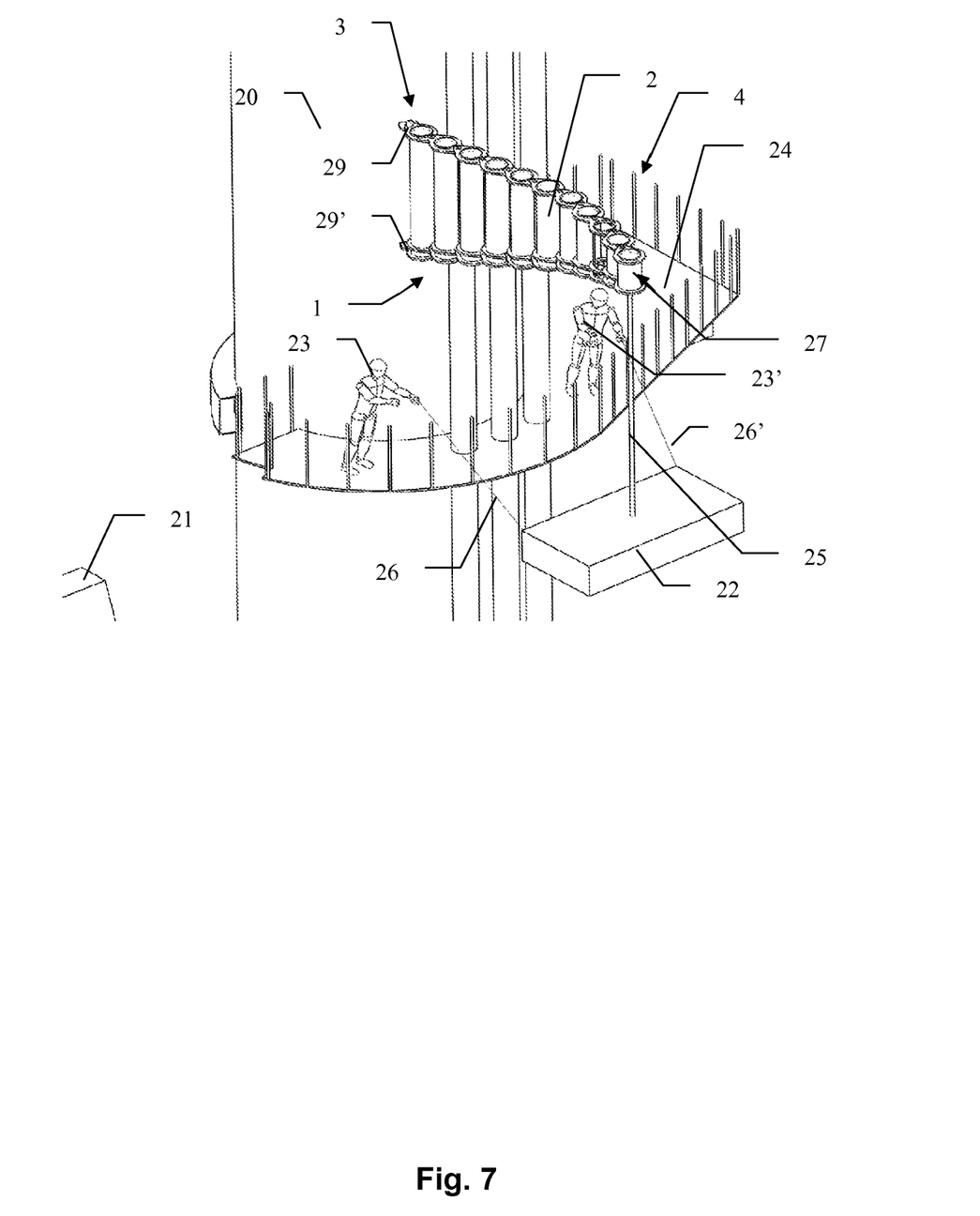
FIG. 7 is to be understood as being consecutive to the FIGS. 5 and 6 and isometrically illustrates how the object to be hoisted easily guided can be turned around the tower of the wind mill, and illustrates that the hoisting of the object is being controlled by persons situated on the platform.

In FIG. 7 the pillar 20 with the platform 24 and the crane arm 1 comprising a plurality of connecting links 2 are isometrically illustrated.

In the illustrated embodiment the first end portion 3 of the crane arm 1 is illustrated mounted on the pillar 20 by means of a pair of mounting means 29, 29'.

While referring to FIGS. 5 and 6, FIG. 7 illustrates the situation where the first person 23 can be the same person as illustrated in FIGS. 5 and 6 or can be a third person who is present on the platform 24 together with the second person 23', whereby both persons are holding reins 26, 26' which are attached to the object 22 carried by the fall 25 hanging down from the second end portion 4 of the crane arm 1.

By means of the winch 27 the object 22 is hoisted up above the vessel 21, and in the illustrated situation the object hanging in the second crane end portion 4 of the crane arm 1 above the vessel 21 is being turned away from the vessel 21.

Thus, by means of two persons 23, 23' it is possible in a simple manner to control the object 22 and to guide it around the pillar 20.

Figure 8:
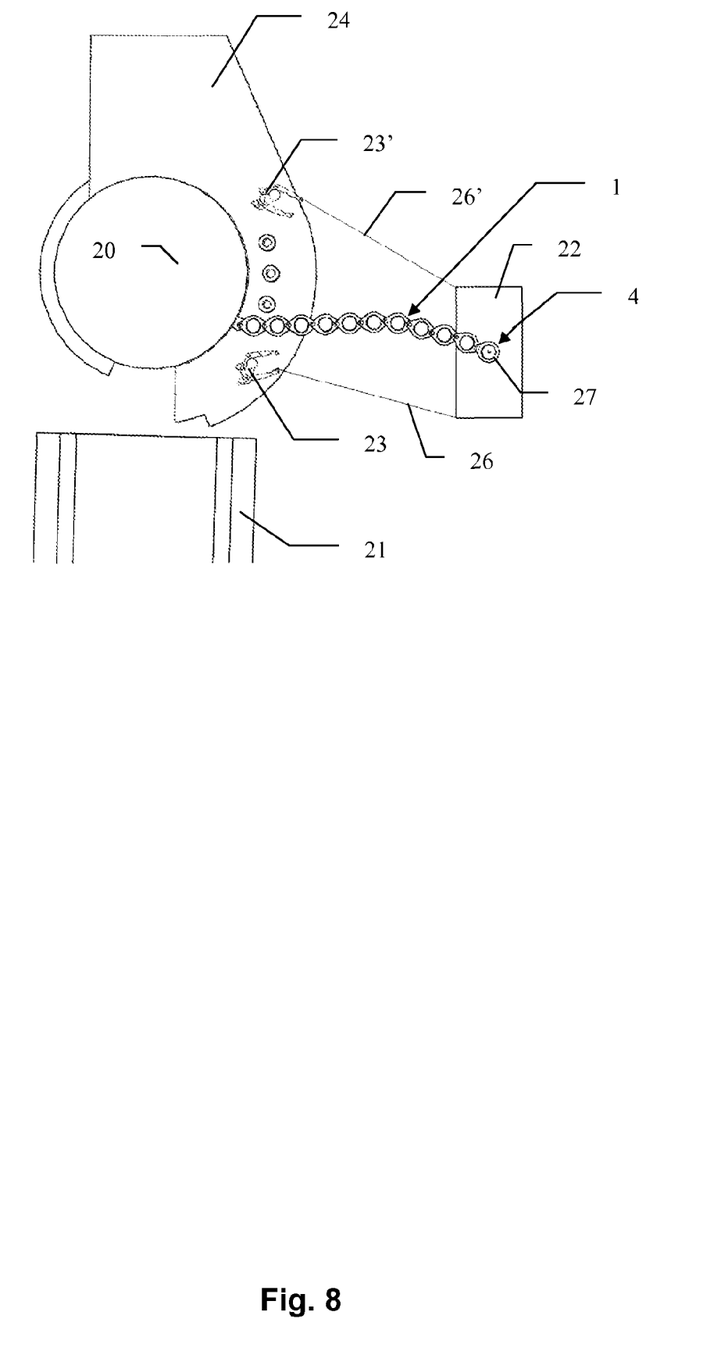
FIG. 8 illustrates the same as FIG. 7, but viewed from above, i.e. as included in a plane oriented rectangular to the force of gravity.

In FIG. 8 a cross section rectangular to the direction of the force of gravity is illustrated, thus as viewed from above illustrating the same situation as illustrated in FIG. 7 and whereby details were described above referring to FIG. 7.

Of FIG. 8 it is easily viewed that the object 22 connected to the second end portion 4 of the crane arm 1 under influence of the force of gravity and the slanting of the crane arm 1, ref. detailed description above referring to FIG. 3, in a natural manner is kept free of the pillar 20.

It is also easily understood that a manual pulling exerted to the reins 26, 26', as performed by the persons 23, 23', results in a flexible moving of the articulate crane arm 1 and the object is being pulled towards the pillar 20.

Figure 9:
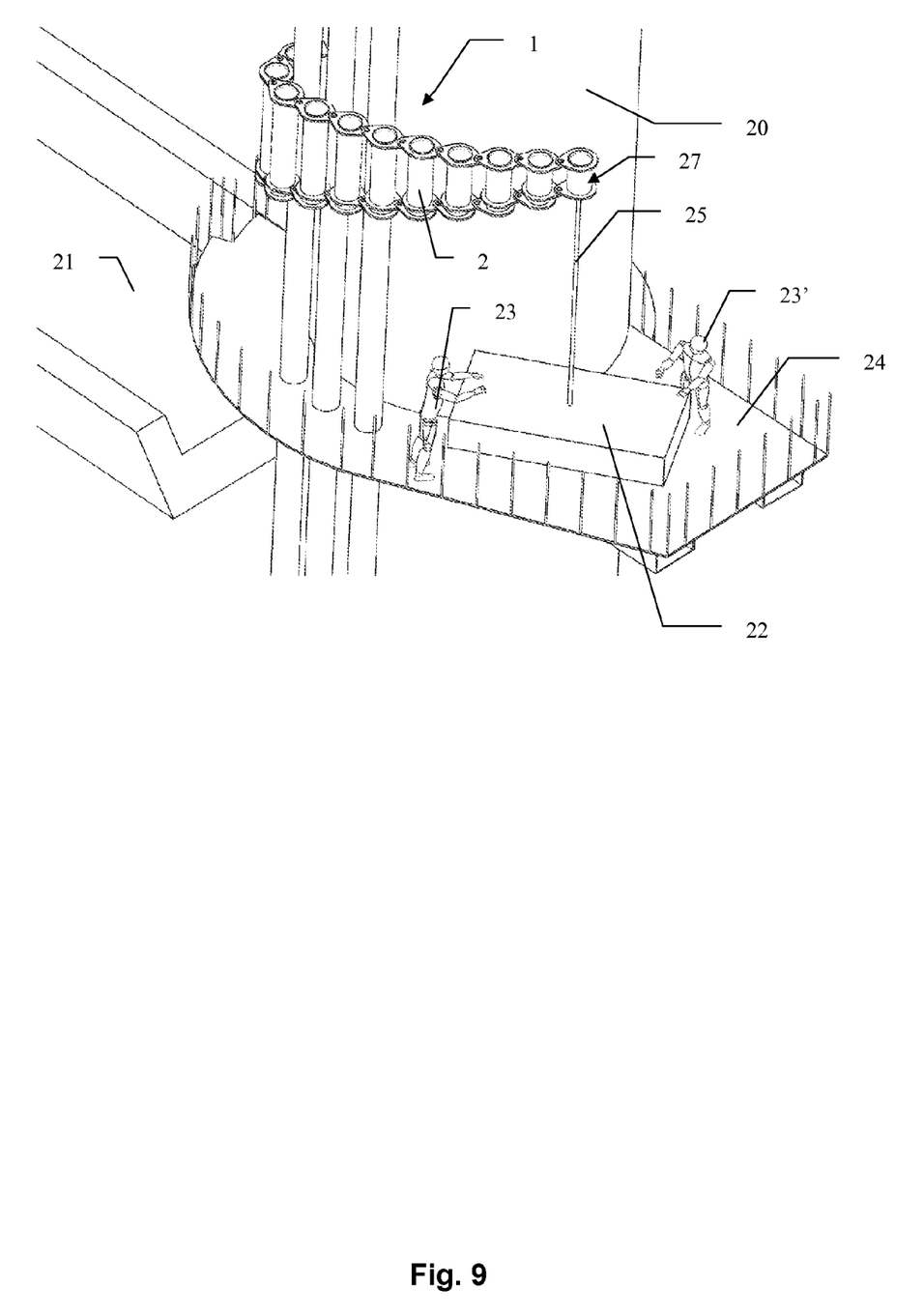
FIG. 9 is to be understood as illustrating a continuation to FIGS. 5, 6, 7 and 8, and isometrically illustrates how the object to be hoisted by means of the crane arm can be moved around the tower of the windmill to a receiving plane portion of a platform which is allocated on the opposite side of the tower, i.e. corresponding to a moving performed through a moving-angle of 180° as calculated from the position of the shown vessel.

In FIG. 9 the pillar 20 with the platform 24 and the crane arm 1 comprising a plurality of connecting links 2 are isometrically illustrated.

As compared to the preceding figs. the situation is that the object has been hoisted further up above and over the platform 24 by means of the winch 27. The illustrated persons 23, 23' have manually pulled the object 22 in over the platform 24, whereby the flexible articulate crane arm 1 from the vessel 21 passing through an angle of about 180° is turned around the pillar 20.

Figure 10:
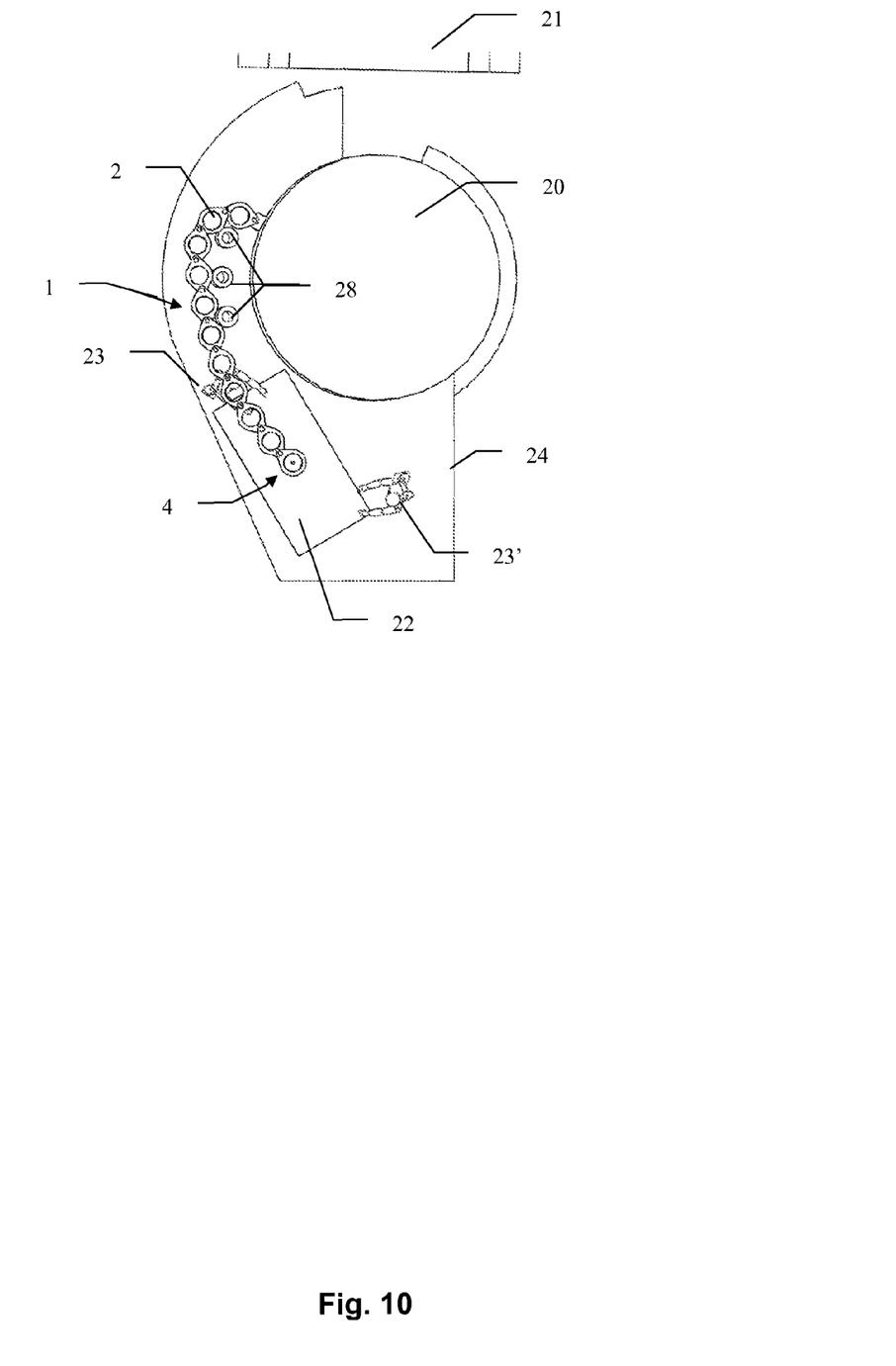
FIG. 10 illustrates the same situation as illustrated in FIG. 9, but as viewed from above, i.e. as included in a plane oriented rectangular to the force of gravity.

In FIG. 10 a cross section rectangular to the direction of the force of gravity is illustrated, thus as viewed from above illustrating the same situation as illustrated in FIG. 9 and the preceding figs. whereby details were described above referring to these figs.

In FIG. 10 is illustrated how flexibly the flexible articulate crane arm 1 is turned around the pillar 20 and brings the object 22 from the vessel 21 through an angle of about 180° around the pillar 20.

In FIG. 10 is illustrated how the connecting links 2 of the crane arm 1 flexibly is moved around hindrances 28.

According to the illustrated embodiment this implies that the above mentioned slanting provided at the second crane end portion 4 of the crane arm 1 under the influence of the force of gravity tends to stretch the crane arm 1 outwards and to flexibly turn it around the pillar 20 and around possible obstacles/hindrances 28.

The invention claimed is:

1. Crane arm (1), comprising a first crane end portion (3) configured to be connected to pillars (20) while the opposite end portion is a free second crane end portion (4), where the crane arm (1) is comprised of a plural of connecting links (2), each connecting link (2) exhibiting a predetermined height (5), and being oriented in the direction (6) of the force of gravity, whereby each connecting link (2) in a longitudinal direction, perpendicular to the direction (6) of the force of gravity, has a first end portion (9) and a second end portion (11) and at the first end portion (9) is provided with at least one first means (8) for providing a rotary connection (17) with a successive connecting link (2) and at the second end portion (11) is provided with at least one second means (10) for the receiving of a preceding first means (8) for providing a preceding rotary connection (17) with a preceding connecting link (2) enabling rotation in a direction around the pillar (20) being oriented perpendicular to the direction (6) of the force of gravity wherein each connecting link (2) has a first means (8) and a second means (10) placed in an upper holding means (13) being mounted at the upper end of a centre element (12) and a lower first means (8') in a lower first holding means (14) placed at the lower end of the centre element (12) and a lower second means (10') in a lower second holding means (15) placed outermost at the lower end of the centre element (12), and in that the upper first and second means (8, 10) in relation to the lower first and second means (8', 10') are placed in relation to each other to form a first rotary axis (16) and a second rotary axis (18), and whereby the rotary axes (16, 18) are arranged in parallel, which upper first and second means (8, 10) and lower first and second means (8', 10') are cooperatively configured so that each of the consecutive connecting links 2, 2" may freely be mounted or respectively disassembled from the preceding connecting link 2', 2, wherein each first means (8) further comprises a protrusion which exhibits a circular cross section and is oriented (6) opposite the force of gravity and cooperates with a corresponding one of the second means (10) for receiving the first means (8), and wherein each second means has a complementary perforation for receiving a first means protrusion and providing of a rotary connection (17).

2. Crane arm (1) according to claim 1, wherein the crane arm (1) at the second end portion (4) further comprises a terminating link (200) comprising an upper and lower second means (10) for providing a rotary connection (17) with a preceding connecting link (2) and hoisting means (27) to be employed with an object (22).

3. Crane arm (1) according to claim 1, wherein each connecting link (2) comprises guiding means for guiding a fall (25) which can be a rope, a tow, a wire, a cable, a chain or the like.

4. Crane arm (1) according to claim 1, wherein heights (5) of each subsequent connecting link (2) is tapering from the first crane end portion (3) towards the second crane end portion (4).

5. Crane arm (1) according to claim 1, wherein the connecting link (2) comprises a centre element (12) of a material which is a metal which can be aluminium or a material being a composite.

6. Crane arm (1) according to claim 1, wherein at least one connecting link (2) at least a portion of the external circumference of the cross section in a direction (6) rectangular to the force of gravity is made of shock absorbing material (19) which can be rubber, polyethylene, polyutherene or similar soft materials.

7. Crane arm (1) according to claim 1, wherein the crane arm (1) at the first crane end portion (3) exhibits a first connecting link (2) with a first means (8) for the rotary connection (17) to the successive connecting link (2') and an assembling means (29) for mounting the crane arm (1) on the pillar (20).

8. Method of loading and/or the offloading of an object (22) from or to a vessel (11) at a nearby position to an offshore installation exhibiting a pillar (20), wherein the loading and/or the offloading takes place through using a crane arm (1) as according to claim 1.

* * * * *